United States Patent [19]
Kiang et al.

[11] Patent Number: 5,867,297
[45] Date of Patent: Feb. 2, 1999

[54] APPARATUS AND METHOD FOR OPTICAL SCANNING WITH AN OSCILLATORY MICROELECTROMECHANICAL SYSTEM

[75] Inventors: Meng-Hsiung Kiang, Berkeley; Kam Y. Lau, Danville; Richard S. Muller, Kensington; Olav Solgaard, Davis, all of Calif.

[73] Assignee: The Regents Of The University Of California, Oakland, Calif.

[21] Appl. No.: 796,301

[22] Filed: Feb. 7, 1997

[51] Int. Cl.[6] .................................................. G02B 26/08
[52] U.S. Cl. ........................ 359/198; 359/199; 359/200; 359/201; 359/202; 359/212; 359/213; 359/214; 359/223; 235/467
[58] Field of Search .................................... 359/198, 199, 359/200, 212–215, 223–225, 201, 202; 235/454, 462, 463, 467, 470

[56] References Cited

U.S. PATENT DOCUMENTS

| | | | |
|---|---|---|---|
| 4,317,611 | 3/1982 | Petersen .................................. | 359/223 |
| 5,361,158 | 11/1994 | Tang ....................................... | 359/204 |
| 5,408,352 | 4/1995 | Peng ....................................... | 359/201 |
| 5,629,790 | 5/1997 | Neukermans et al. .................. | 359/198 |

OTHER PUBLICATIONS

Daneman et al., "Integrated Laser–to–Fiber Cou0ling Module Using a Micromachined Alignment Mirror", *Conference on Lasers and Electro–Optius*, 1995, Technical Digest Series, vol. 15, pp. 245–250, Baltimore, MD, May 1995.

Daneman et al, "Linear Microvibromotor for Positioning Optical Components", *J of Microelectromechanical Systems*, 5(3):159–165 (1996). (No Month).

Daneman et al., "Linear Virbromotor–Actuated Micromachined Microreflector for Integrated Optical Systems", *Solid–State Sensor and Actuator Workshop*, Hilton Head, SC, Jun. 2–6 1996.

Deng et al., "The Development of Polysilicon Micromotors for Optical Scanning Applications", *Solid–State Sensor and Actuator Workshop*, pp. 234–238, Hilton Head, SC, Jun. 13–16, 1994.

Kiang et al., "High–Precision Si–Micromachined Micromirrors with On–Chip Actuation for External–Cavity Semiconductor Lasers", *Conference on Lasers and Electro–Optics*, Technical Digest Series, vol. 15, pp. 248–249, Baltimore, MD, May 1995.

Kiang et al., "Silicon–Micromachined Micromirrors with Integrated High–Precision Actuators for External–Cavity Semiconductor Lasers", *IEEE Photonics Technology Letters*, 8(1):95–97, Jan. 1996.

Pister et al., "Microfabricated Hinges", *Sensors and Actuators*, 33(3):249–256 (1992). (No Month).

Solgaard et al., "Optoelectronic Packaging Using Silicon Surface–Micromachined Alignment Mirrors", *IEEE Photonics Technology Letters*, 7(1):41–43 (1995). (No Month).

Solgaard et al., "Precision and Performance of Polysilicon Micromirrors for Hybrid Integrated Optics", *SPIE, Symposium on Lasers and Applications*, San Jose, CA, Feb. 1995.

Tien et al., "Surface–Micromachined Mirrors for Laser––Beam Positioning", *Sensors and Actuators*, A 52:76–80 (1996). (No Month).

Tsufura et al., "Barcode Scanning On–Going Evolution & Development", *Lasers & Optronics*, Jul. 1995.

Yasseen et al., "Diffraction Grating Scanners Using Polysilicon Micromotors", *Proceedings IEEE Micro Electro Mechanical Systems*, pp. 175–180, Amsterdam, The Netherlands, Jan. 1995.

*Primary Examiner*—James Phan
*Attorney, Agent, or Firm*—William S. Galliani; Flehr Hohbach Test Albritton & Herbert LLP

[57] ABSTRACT

An optical scanning system includes a light source to generate a light beam. An oscillatory microelectromechanical system including a mirror deflects the light beam in a predetermined manner. The light source and microelectromechanical system are formed in a silicon substrate. Rotational shafts in the microelectromechanical system facilitate oscillatory movement of the mirror.

17 Claims, 10 Drawing Sheets

APPARATUS AND METHOD FOR OPTICAL SCANNING WITH AN OSCILLATORY MICROELECTROMECHANICAL SYSTEM

BRIEF DESCRIPTION OF THE INVENTION

This invention relates generally to optical scanners. More particularly, this invention relates to a microelectromechanical system that operates as an oscillatory optical scanner.

BACKGROUND OF THE INVENTION

This invention was made with Government support under Grant (Contract) No. DABT-63-95-C-0055 awarded by the Advanced Research Project Agency and Grant (Contract) No. ECS-9419112 awarded by the National Science Foundation. The Government has certain rights to this invention.

Optical scanners are used for scientific and industrial applications ranging from laser imaging and displays to laser surgery tools and home-office appliances, such as facsimile machines and printers. Barcode optical scanners are used for automatic object-identification. Most optical scanners use a polygon mirror. Unfortunately, a polygon mirror requires precision machining for the polygon surfaces to insure flatness and repeatability when the laser beam sweeps across the reflecting facets. In addition, a polygon mirror is relatively bulky. A polygon mirror can be considered a macroscopic device. As used herein, a macroscopic device is a device with a third dimension greater than approximately several milli-meters, where the third dimension refers to the height above a horizontal substrate. A microscopic device is a device with a third dimension less than approximately several milli-meters.

Figure 1:
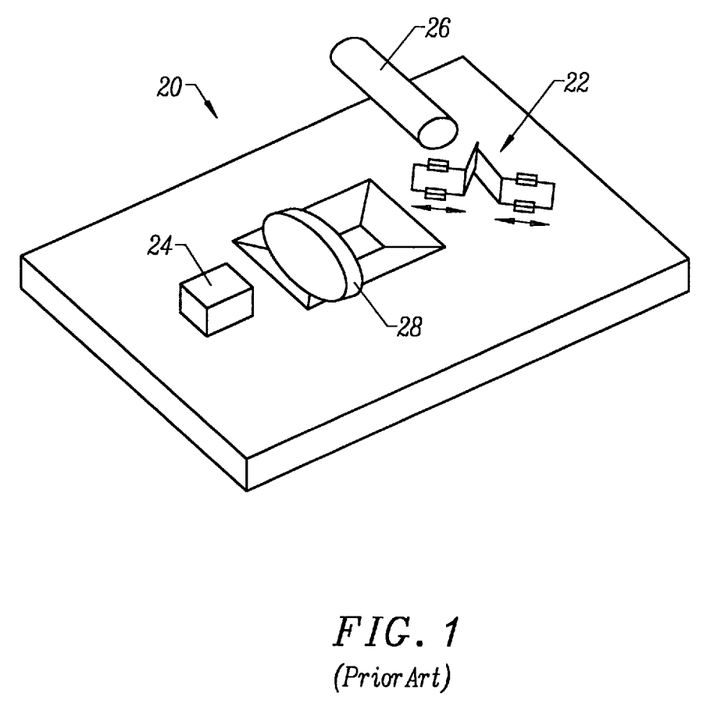
FIG. 1 is a perspective view of an optical MEMS system in accordance with the prior art.

Silicon-surface-micromachining technology has been used to fabricate microscopic devices. In particular, optical microelectromechanical systems (MEMS) have been implemented with movable-micromirrors. FIG. 1 illustrates an optical MEMS 20 in accordance with the prior art. The optical MEMS 20 includes a MEMS mirror assembly 22, which optically links a laser 24 to an optical fiber 26. A lens assembly 28 is positioned between the laser 24 and the MEMS mirror assembly 22.

Figure 2:
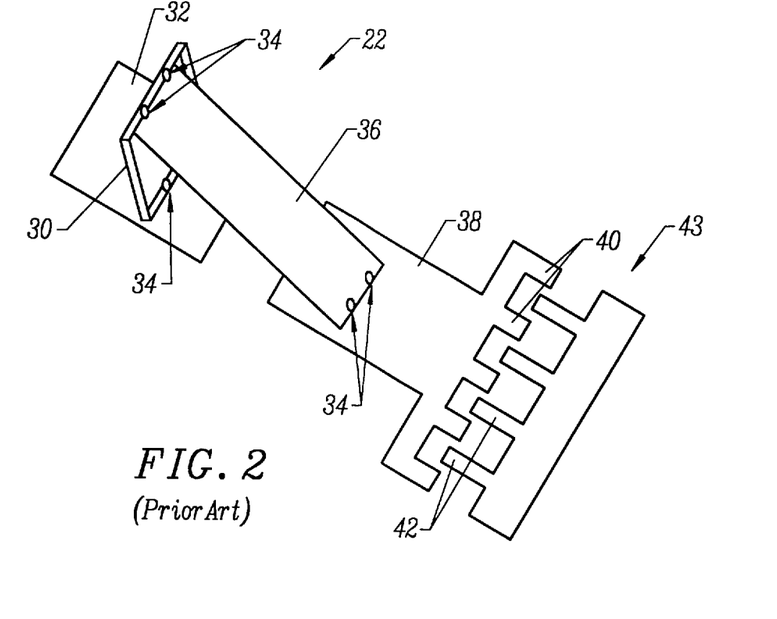
FIG. 2 is a perspective view of a MEMS mirror assembly in accordance with the prior art.

FIG. 2 is a more detailed illustration of a MEMS mirror assembly 22 that may be used with the apparatus of FIG. 1. The MEMS mirror assembly 22 includes a mirror 30 positioned on a mirror slider 32 through the use of hinges 34. Hinges 34 are also used to couple the top of the mirror 30 to the top of a support 36. The bottom of the support 36 is connected to a support slider 38 through the use of hinges 34.

The support slider 38 includes support slider comb fingers 40, which are in an inter-digit arrangement with stator comb fingers 42. The combination of the support slider comb fingers 40 and the stator comb fingers 42 form a comb drive 43. As known in the art, a comb drive uses capacitive charge between support slider comb fingers 40 and stator comb fingers 42 to alternately push the support slider 38 away from the stator comb fingers 42 or pull the support slider 38 toward the stator comb fingers 42. In this way, the mirror 30 can be fabricated within the horizontal plane of a semiconductor and then be lifted into a vertical configuration (third dimension) with respect to the semiconductor, as shown in FIG. 2. A comb drive may also be used in relation to the mirror slider 32 to facilitate this process.

Figure 3:
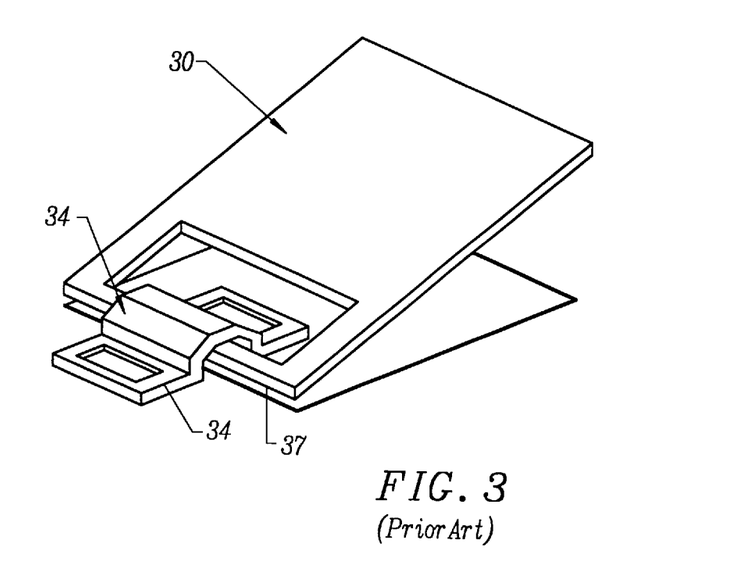
FIG. 3 is a perspective view of a hinge and mirror combination in accordance with the prior art.

FIG. 3 illustrates a pin-and-staple hinge 34, which includes a staple portion 35 and a pin portion 37. The pin portion 37 forms a segment of mirror 30. The figure illustrates how the mirror 30 is allowed to pivot about the hinge 34, thereby allowing the mirror 30 to be lifted from a horizontal plane of a semiconductor surface and into a vertical plane with respect to the semiconductor surface.

MEMS mirror assemblies of the prior art have been limited to relatively slow mirror movement. That is, the comb drives have been used to slightly modify an initial mirror position. Thus, MEMS mirror assemblies of the prior art have not been used for scanning. In other words, prior art MEMS mirror assemblies have not been used to rapidly traverse a range of positions in a coordinate axis. In the absence of this capability, the utility of MEMS in optical systems is limited. Accordingly, it would be highly desirable to provide a MEMS suitable for optical scanning operations. Such a device could thereby operate as a building block in a variety of opto-electrical equipment.

SUMMARY OF THE INVENTION

The optical scanning system of the invention includes a light source to generate a light beam. An oscillatory microelectromechanical system including a mirror deflects the light beam in a predetermined manner. The light source and microelectromechanical system are formed on a silicon substrate. Rotational shafts in the microelectromechanical system facilitate oscillatory movement of the mirror.

The device of the invention is on a microscopic scale, thus it is compact and extremely light weight. The power consumption of the device is minimal. High precision positioning over a large angular range makes the invention suitable for a variety of optical applications, such as laser scanners and printers, displays, holographic-data storage, and fiber-optic switches.

The device of the invention can be packaged in vacuum or hermetically sealed to reduce air damping, mirror deformation and particulate erosion of the mirror surface. The mechanical Q-factors of the scanners have been found to increase significantly even under a moderate vacuum. The device of the invention can be produced inexpensively because it can be batch-fabricated.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 4:
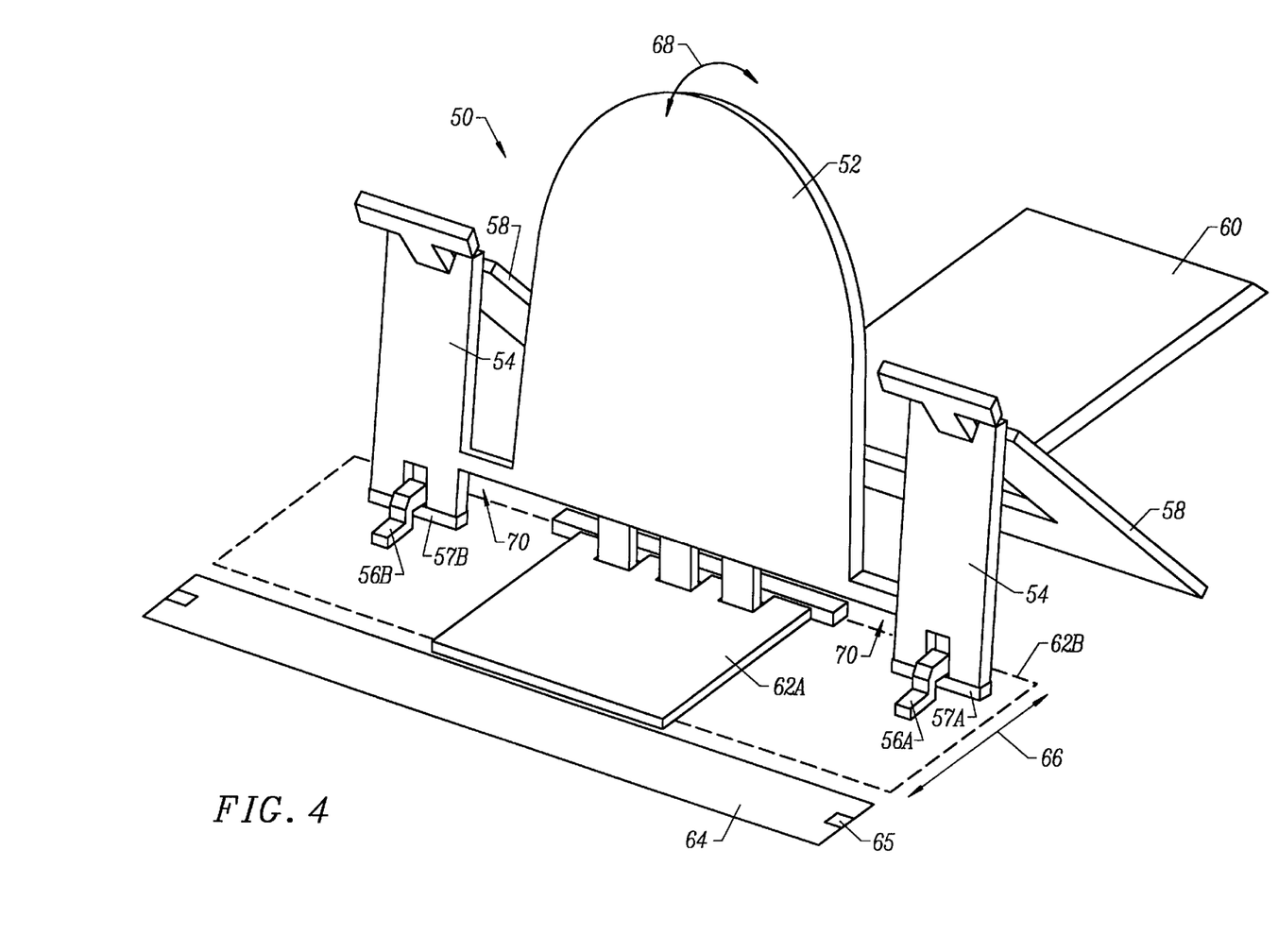
FIG. 4 is a perspective view of an optical scanning resonant MEMS in accordance with an embodiment of the invention.

FIG. 4 is a perspective view of an optical scanning oscillatory MEMS 50 in accordance with an embodiment of the invention. The device 50 includes a mirror 52 connected to a frame support 54. Hinges 56A, 56B interlock with the frame support 54. A mirror lift support 58 is connected at the top of the frame support 54. A mirror lift support slider 60 is connected to the base of the mirror lift support 58.

A mirror slider 62A is connected to the mirror 52. A comb drive 64 is connected to the mirror slider 62A. The comb drive 64 forces the mirror slider 62A back and forth along the axis marked by arrow 66. This, in turn, causes the mirror 52 to rotate front-to-back, as shown with arrow 68. This front-to-back motion can be thought of as lifting the mirror 52 in and out of the plane defined by the mirror frame support 54.

A key distinguishing feature of the device 50 is that it operates in an oscillatory mode. That is, the device 50 is configured such that it regularly traverses through a predefined path. In certain embodiments of the invention, the oscillatory device 50 resonates. That is, the device 50 is configured such that it has a natural vibration frequency that coincides with an applied vibrational force from the comb drive 64. The oscillatory and/or resonant operation of the device 50 allows the mirror 52 to rapidly move, thereby making it suitable for optical scanning operations.

The oscillatory motion of the mirror 52 may be achieved by moving the entire mirror slider 62. FIG. 4 illustrates, in phantom, a mirror slider 62B that supports hinges 56A, 56B. As shown with arrow 66, the entire mirror slider 62 may be moved by the comb drive 64. The prior art has used relatively large mirror sliders such as 62B, however, such mirror sliders have not been used in an oscillatory mode.

In a preferable embodiment, the mirror 52 is only attached to the mirror slider 62A and the hinges 56A, 56B are fixedly attached to a substrate. In such an embodiment, rotational movement of the mirror 52 is achieved through torsion bars 70. The torsion bars 70 are a type of rotational shaft. Observe that each hinge 56 secures a pin 57 of the mirror frame support 54. The pins 57 also constitute a type of rotational shaft.

Figures 5A, 5B, 6:
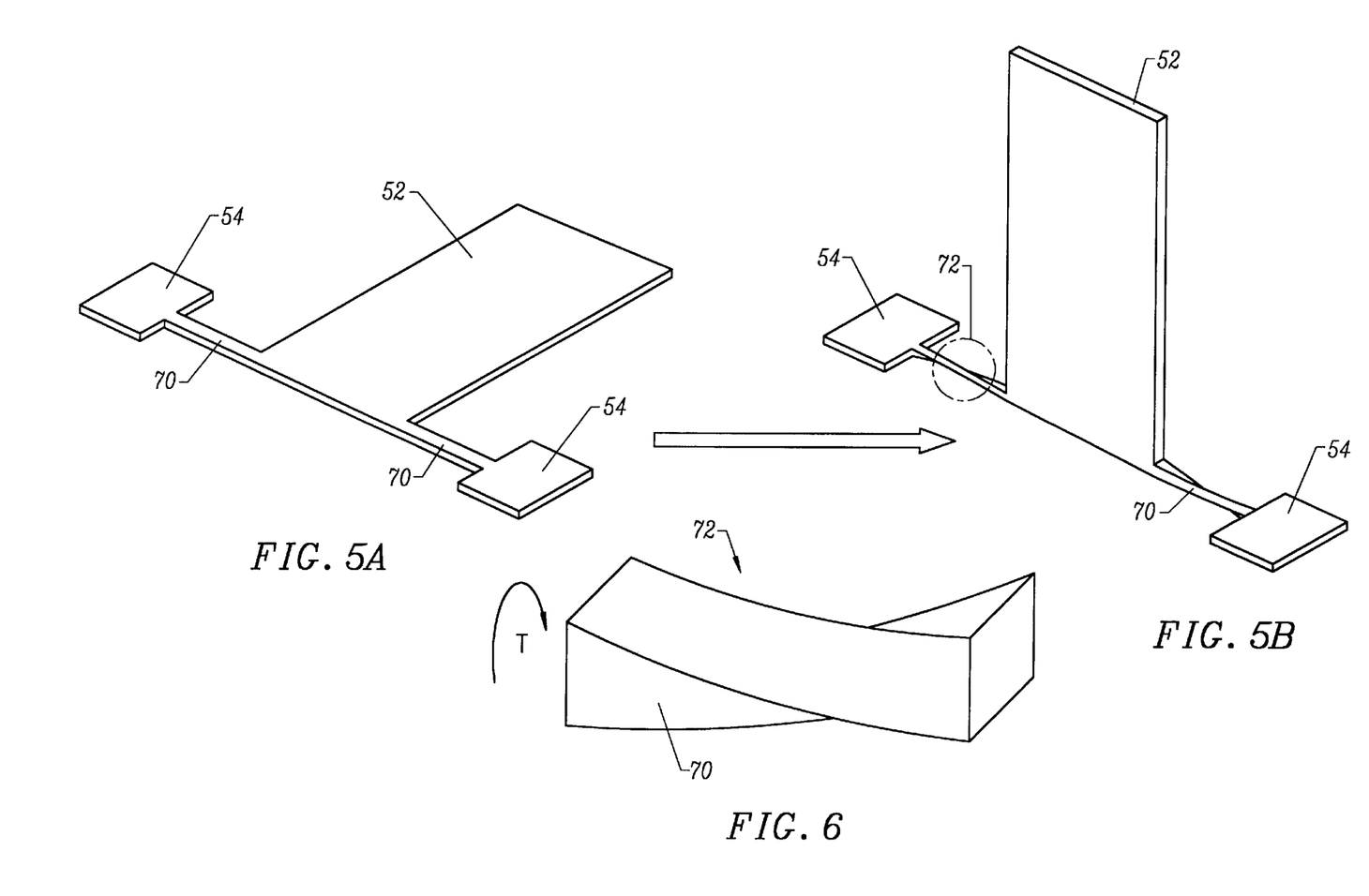
FIGS. 5A–5B illustrate the movement of torsion bars of the optical scanning resonant MEMS of FIG. 4.
FIG. 6 is a more detailed illustration of a torsion bar of FIG. 5B.

FIG. 5A illustrates torsion bars 70 connected between a mirror 52 and mirror frame support segments 54. In FIG. 5A, the mirror is in the horizontal plane defined by the mirror frame support 54. In FIG. 5B, the mirror is twisted into a plane that is perpendicular to the horizontal plane defined by the mirror frame support 54. Region 72 of FIG. 5B illustrates how the torsion bars 70 support this twisting motion.

FIG. 6 is an enlarged view showing the twisting action of the torsion bar 70.

Figure 7:
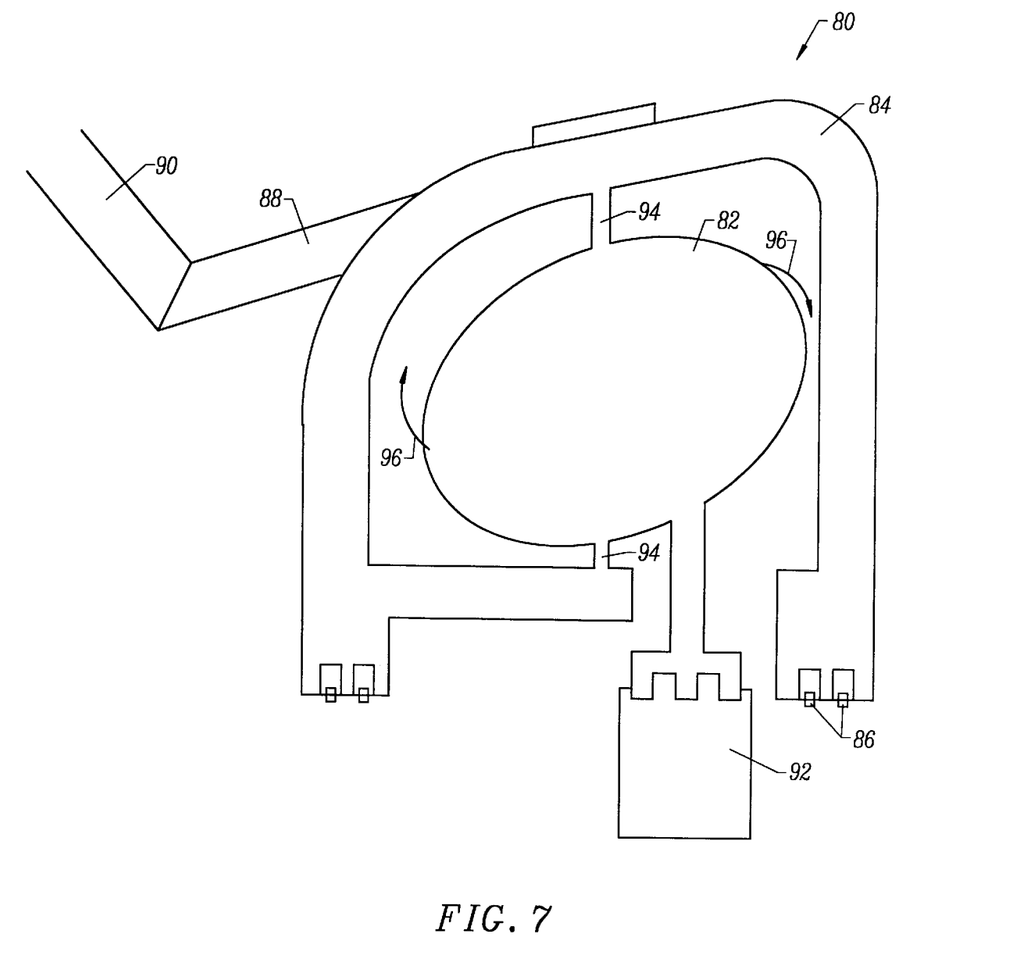
FIG. 7 is a perspective view of an optical scanning resonant MEMS in accordance with another embodiment of the invention.

FIG. 7 is a perspective view of an optical scanning resonant MEMS 80 constructed in accordance with an alternate embodiment of the invention. The device 80 includes a mirror 82 supported by a mirror frame support 84. Hinges 86 are used to attach the mirror frame support 84 to a substrate. A mirror lift support 88 is attached to the mirror frame support 84. A mirror lift support slider 90 is attached to the mirror lift support 88. A mirror slider 92 is attached to the mirror 82. A comb drive (not shown) pushes or pulls the mirror 82, allowing it to rotate on torsion bars 94. The resultant motion is illustrated with arrows 96. The mirror 82 moves in and out of the plane defined by the mirror frame support 84. In particular, the left and right sides of the mirror 82 move in and out of the plane defined by the mirror frame support 84. This embodiment is in contrast to the embodiment of FIG. 4 where the top and bottom of the mirror 52 move in and out of the plane defined by the mirror frame support 54. The embodiment of FIG. 7 can be used for X-axis scanning, while the embodiment of FIG. 4 can be used for Y-axis scanning.

In one embodiment, the mirror 52 of FIG. 4 is implemented as a 200 by 250 micro-meter device. The electrostatic comb drive for the system is implemented with 100 interdigitated fingers for both the rotor and the stator on the two sides, with lateral dimensions totaling 1 mm. The comb drive motor may be attached to the mirror slider 62 through a pair of restoring springs. In one embodiment, the folded restoring springs are trusses composed of four 300 micron long beams, each having a 4 micron square cross-section. The maximum excursion of the rotor comb from its rest position is determined by the length of the comb fingers which, in this design, is limited to 20 micro-meters. At 150 micro-meters away from the mirror shaft, this 20 micrometer displacement results in a 7.6 degree rotation of the mirror. In other words, the maximum scan angle of this resonant structure is approximately 15 degrees (30 degree optical) if driven on resonance with a sufficiently large ac voltage applied to an input node 65 of the comb drive 64. This scan angle compares well with typical performance characteristics obtained in macroscopic resonant scanners.

FIGS. 8–19 illustrate the processing sequence used to fabricate an optical scanning oscillatory MEMS. On top of the polysilicon ground plane which was common to the electrostatic combdrives, three layers of structural polysilicon (each 2 micrometers thick) were laid down to construct the scanning micromirrors. Low-pressure chemical-vapor deposition (LPCVD) of phosphosilicate glass (PSG) was used as the sacrificial material separating the different polysilicon layers. The PSG was also used as the hard mask for the structural polysilicon layers when they were etched in chlorine-based plasma for pattern definition.

Figure 8:
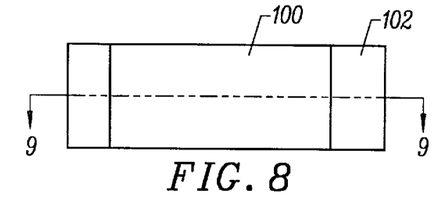
FIGS. 8–19 illustrate processing steps leading to the construction of an optical canning resonant MEMS in accordance with an embodiment of the invention.
Figure 9:
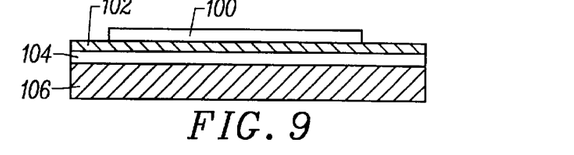
Figure 10:
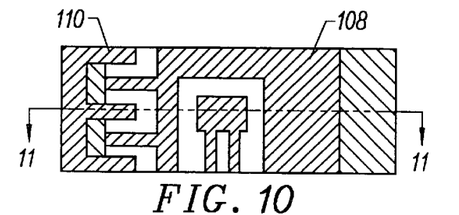

The silicon substrate was first passivated by successive layers of LPCVD thermal silicon dioxide and silicon nitride. A 0.5 micrometer-thick film of in situ phosphorous-doped LPCVD polysilicon was then deposited and patterned to form the ground plane for the electrostatic comb motor. FIG. 8 illustrates a polysilicon ground plane 100 on a $Si_3N_4$ base 102. FIG. 9, taken along the line 9—9 of FIG. 8, illustrates the polysilicon ground plane 100, the $Si_3N_4$ base 102, an $SiO_2$ 104 layer, and a silicon substrate 106.

A thick (2 micrometer) layer of sacrificial LPCVD PSG was then deposited. Indentations were wet-etched with 5:1 hydrofluoric acid (HF) on the PSG surface to create dimples in the subsequent polysilicon layer. The dimples reduce the surface-contact area and, therefore, the "stiction" between the two surfaces. Openings were also etched in the PSG by a fluorine-based (CF4) plasma so that the next polysilicon layer can be anchored to the substrate or to the polysilicon ground plane.

Figure 11:
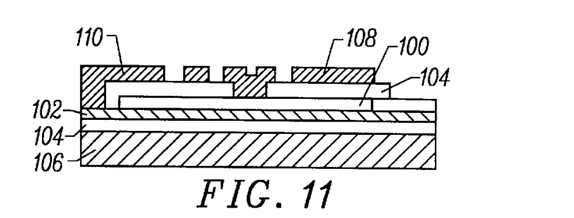

The first structural polysilicon layer was then deposited and patterned to form the combdrives, back supports, sliders and the bottom plate of the hinge structures. FIG. 9 illustrates a polysilicon region 108 forming the movable comb and a polysilicon region 110 forming the stationary comb. The corresponding cross-sectional view of this structure is shown in FIG. 11.

Figure 12:
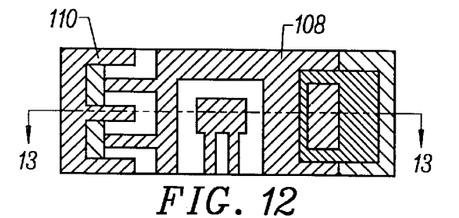
Figure 13:
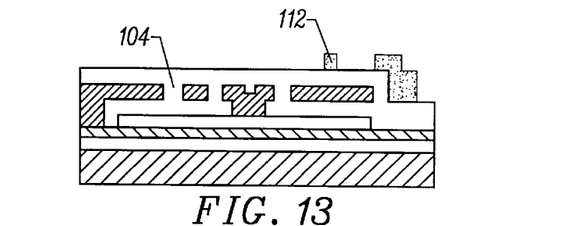
Figure 14:
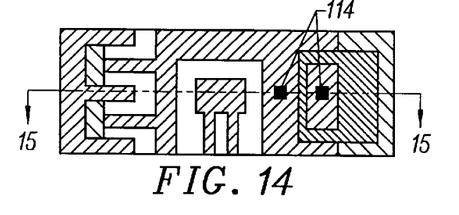
Figure 15:
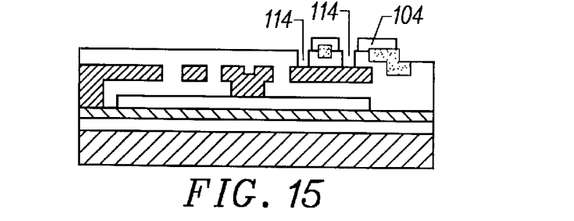

Another layer of sacrificial PSG was deposited, and again openings were dry etched to make the anchors of the guides out of the second structural polysilicon layer. A pin structure was also formed in this polysilicon layer. FIG. 12 illustrates a pin structure 112 formed from the second structural polysilicon layer. FIG. 13 is a corresponding cross-sectional view. FIG. 14 illustrates openings 114 that are subsequently used to form staple posts. FIG. 15 is a corresponding cross-sectional view.

Figures 16, 17:
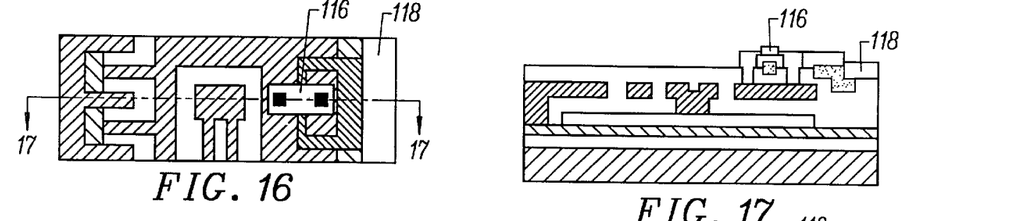

The final structural polysilicon layer was deposited on top of the third sacrificial PSG layer, and the body of the mirror and the staples of the pins for the hinge structures were formed in it. FIG. 16 illustrates a staple structure 116 and mirror 118 formed from the final structural polysilicon layer. FIG. 17 is a corresponding cross-sectional view.

Figures 18, 19:
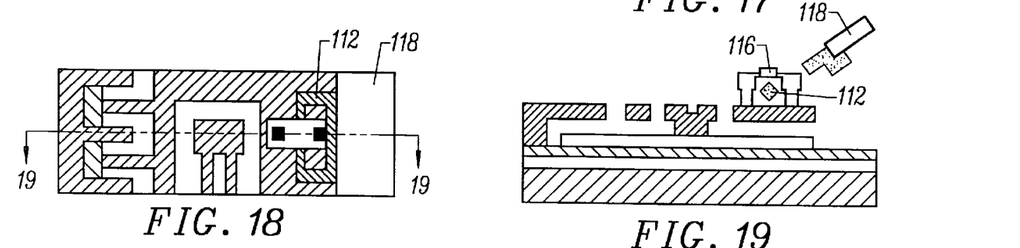

The last step was etching through-holes in the larger polysilicon areas to reduce the final wet-etching time in concentrated HF used to release the mechanical parts. Once the sacrificial PSG was removed, the released polysilicon layers can be removed and the structures assembled. FIGS. 18 and 19 illustrate the released mirror 118.

Increasingly thicker (up to 7 micrometers) layers of photoresist were used to accommodate the large topographical step heights. As a result, polysilicon "stringers" can form around the polysilicon structures. Over etching of the polysilicon layers alleviates the stringer problem. If stringers remain after the fabrication is completed, a timed etch in 10:1 HF to dissolve the PSG that holds the stringers can be used to remove them before the final release step.

It is possible to simplify the fabrication process using only three layers (two structural layers) of polysilicon with alternative hinge designs. The pin-and-staple microhinges have been replaced by torsion bars serving as the rotation shaft and by cross-weaving polysilicon stripes for the connecting and assembly hinges. Using torsion or flexing hinges also reduces the errors introduced from the bearing friction in the pin and staple configuration.

Figure 20:
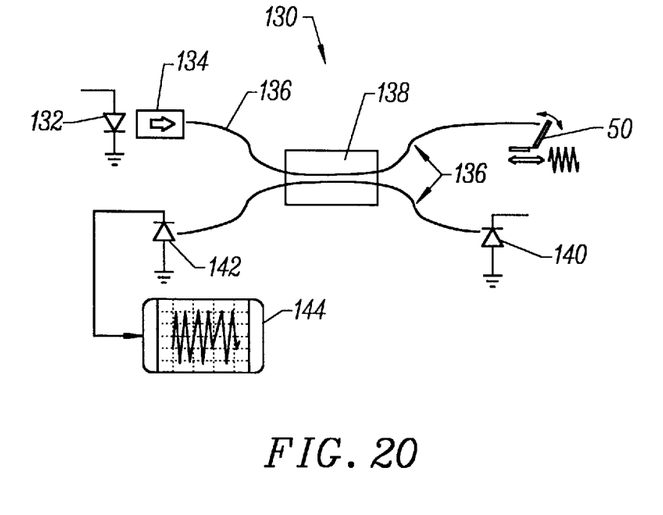
FIG. 20 illustrates an optical interferometric measurement apparatus used to test the device of the invention.

The dynamic response of the optical scanning oscillatory MEMS of the invention has been characterized using an interferometric apparatus 130 as depicted in FIG. 20. A laser beam from a single-mode 1.3 micro-meter DFB laser diode 132 is coupled into a single-mode fiber 136 with a 3 dB coupler 138 that splits the beam between two output ports. The optical scanning oscillatory MEMS 50 is placed in front of one of the outputs, so that the top part of the mirror 52 and the fiber end-facet forms a Fabry-Perot interferometer. The other output of the splitter is used to monitor the laser power level via diode 140. Light reflected from the etalon and coupled back into the fiber is detected by a photodiode 142. Varying-frequency sinusoidal voltage waveforms (20V in amplitude) are applied to the comb drive 64.

Figure 21:
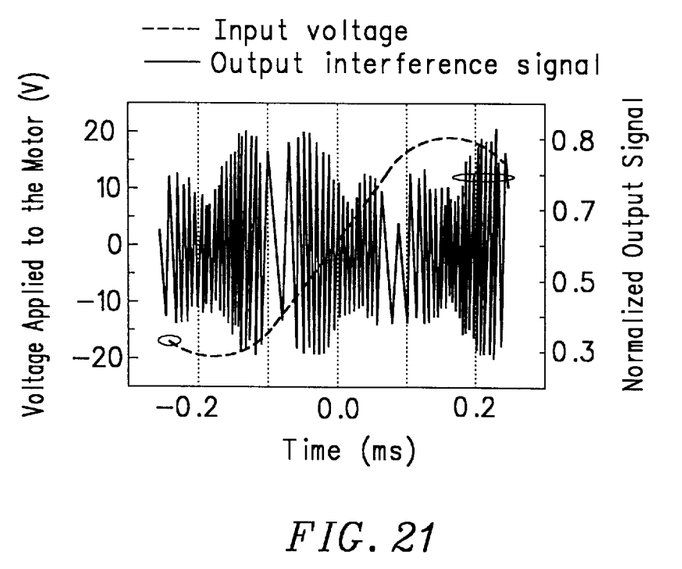
FIG. 21 illustrates a typical output signal when a device of the invention is driven on resonance with a 20-V sinusoidal voltage.

A typical interference pattern is shown in FIG. 21. Recorded when a 1.5 kHz ac voltage is applied to the comb motor (i.e. when the micromirror is resonating at 3 kHz), the trace in FIG. 21 shows that the tip of the scanning micromirror sweeps across more than 23 cycles of constructive and destructive interference. With the laser wavelength of 1.3 micro-meters, this corresponds to approximately 15 micro-meters of displacement for the top end of the mirror 52. In other words, when the electrostaticcomb motor 64 is ac-driven on resonance with a sinusoidal voltage of 20 V in amplitude, the mirror 52 can deflect the laser beam by almost 12° in angle.

Figure 22:
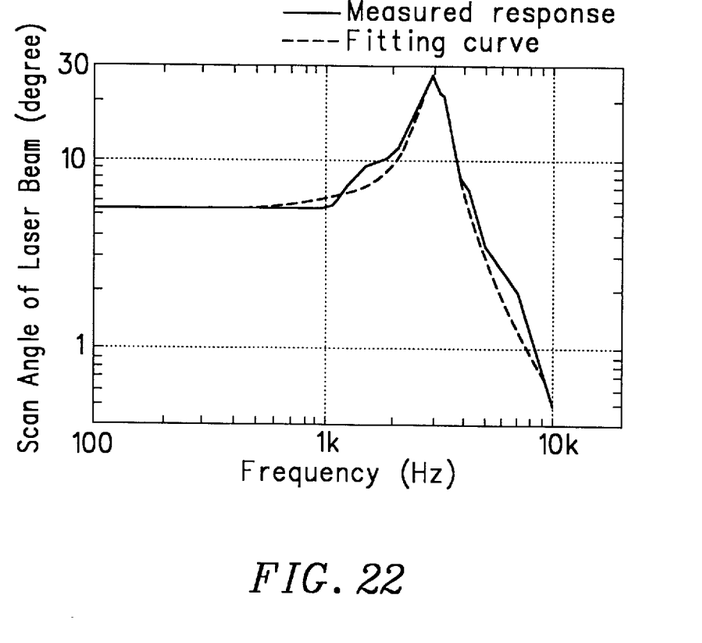
FIG. 22 illustrates the amplitude and phase frequency response of an optical scanning resonant MEMS of the invention.

Plotted in FIG. 22 is the large-signal frequency response of the optical scanning oscillatory MEMS 50. Resonating at 3 kHz with a system Q-factor of 2.8, the device has a maximum-optical-scan angle measured to be 28°. The dotted curve shows the theoretical model of a forced-damped-oscillation with a damping force proportional to the linear velocity of the moving parts in the mechanical system. The hump around 1.5 kHz in the measured curve is due to the second harmonic of the ac voltage (a dc bias voltage is applied in addition to the ac voltage).

Figure 23:
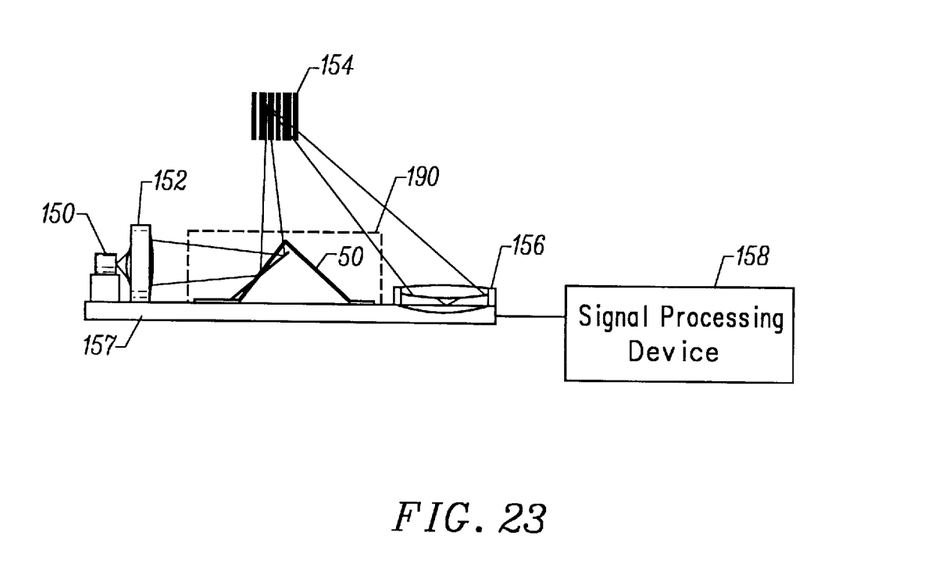
FIG. 23 illustrates the optical scanning resonant MEMS of the invention incorporated into a barcode reading system.

To demonstrate barcode scanning using the optical scanning resonant MEMS 50, the apparatus of FIG. 23 was constructed. The apparatus includes a laser 150, objective lens 152, an optical scanning oscillatory MEMS 50, a barcode object 154, a photodetector with a collecting lens 156, and a signal processing device 158. Elements 150, 152, 50, and 156 are fabricated on a silicon substrate 157. The signal processing device 158 may also be implemented in the silicon substrate 157. The signal processing device 158 may also be implemented as a microprocessor and related software. Regardless of the implementation, the following signal processing operations are performed.

For simplicity, the post-objective scanning scheme is adopted so that no $f\theta$-filled-flattening lens is needed. The distortion introduced by mapping a nonplanar image plane to a flat image surface (the barcode) is not a concern as long as the depth-of-field of the optical system is sufficiently long such that the spot size at the barcode is always small enough to resolve the thinnest bars.

The scanning speed of the resonant scanner 50 varies in a sinusoidal fashion. Consequently, the detected signal as a function of time does not correspond to the bar widths and spacings in a straight-forward manner. However, the lack of correspondence can be compensated by considering the following.

The motion of a scanner operating at mechanical resonance is:

$$\theta = \theta_s \sin(\omega t) \quad \text{(Equation 1)},$$

where $\theta$ is the scanner (mirror) angle, $\theta_s$ is the maximum excursion angle, and $\omega$ is the angular resonance frequency. It follows that:

$$\delta\theta/\delta t = \omega\theta_s \cos(\omega t) \quad \text{(Equation 2)}.$$

When a laser beam is reflected off the surface of the scanning mirror, the linear displacement x in the image plane is:

$$x = S\tan(2\theta) \quad \text{(Equation 3)},$$

where S is the distance from the scanner mirror to the image plane (a constant for a flat image plane). Therefore, $$\delta\theta/\delta t = 2S(1+\tan^2 2\theta)\delta\theta/\delta t \quad \text{(Equation 4)}.$$

Substituting equation (1) into (3) gives the relation between the linear displacement with time which can be used to translate the detected time signal into a spacial equivalent. Alternately, the combination of equations (2) and (4) relates the angular velocity of the scanner to the linear scan rate of the laser beam.

Figure 24:
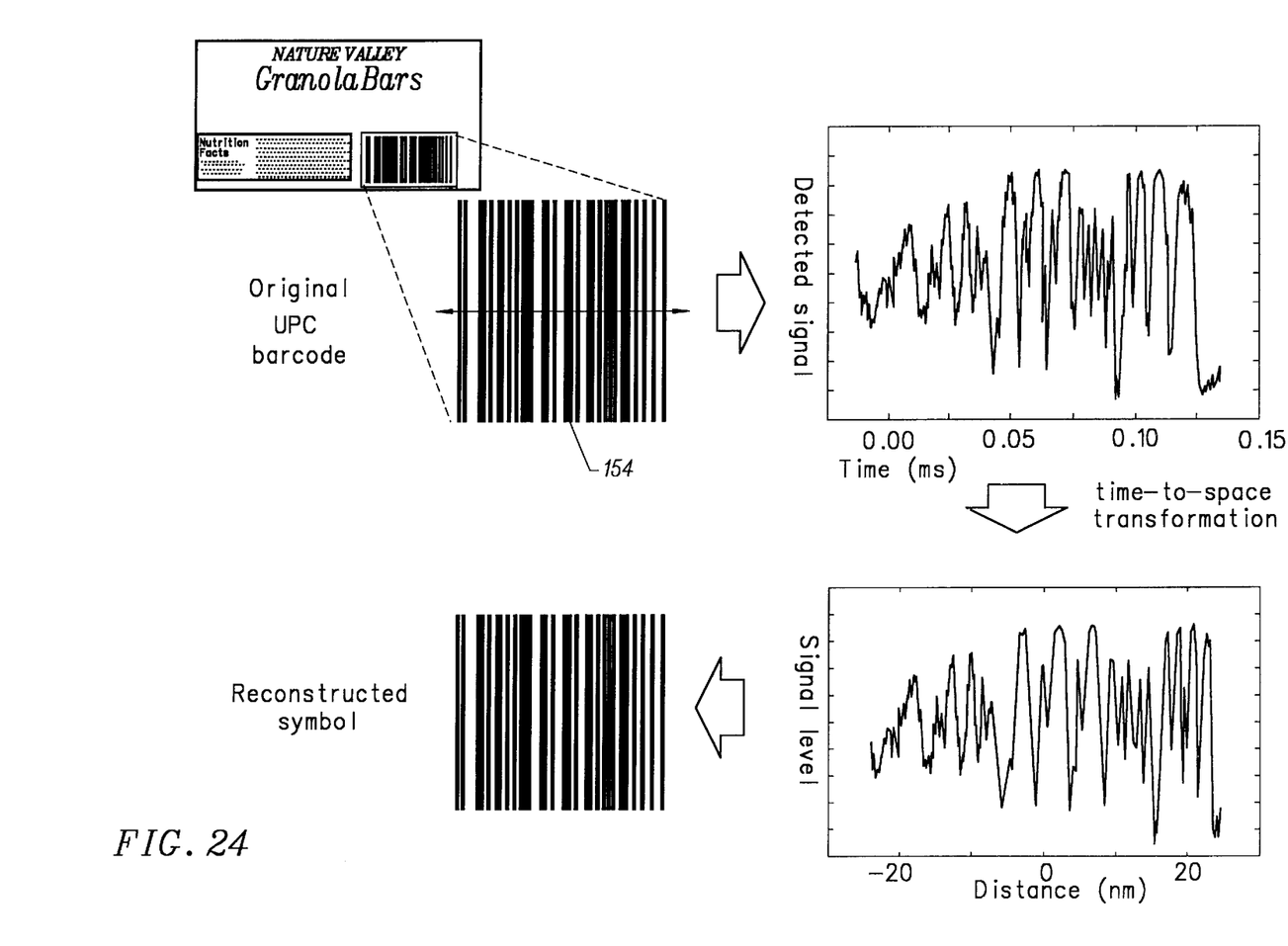
FIG. 24 illustrates a barcode signal detected with a device of the invention.

FIG. 24 illustrates a barcode object 154 that is processed using the apparatus of FIG. 23. A 1.5 mw red He—Ne laser is used as the laser 150. The backscattered light from the barcode is received by the photodetector/collecting lens 156. FIG. 24 shows the recorded signal and the reconstructed black-and-white pattern corresponding to the scanned barcode symbol, as generated by the signal processing device 158.

Figure 25:
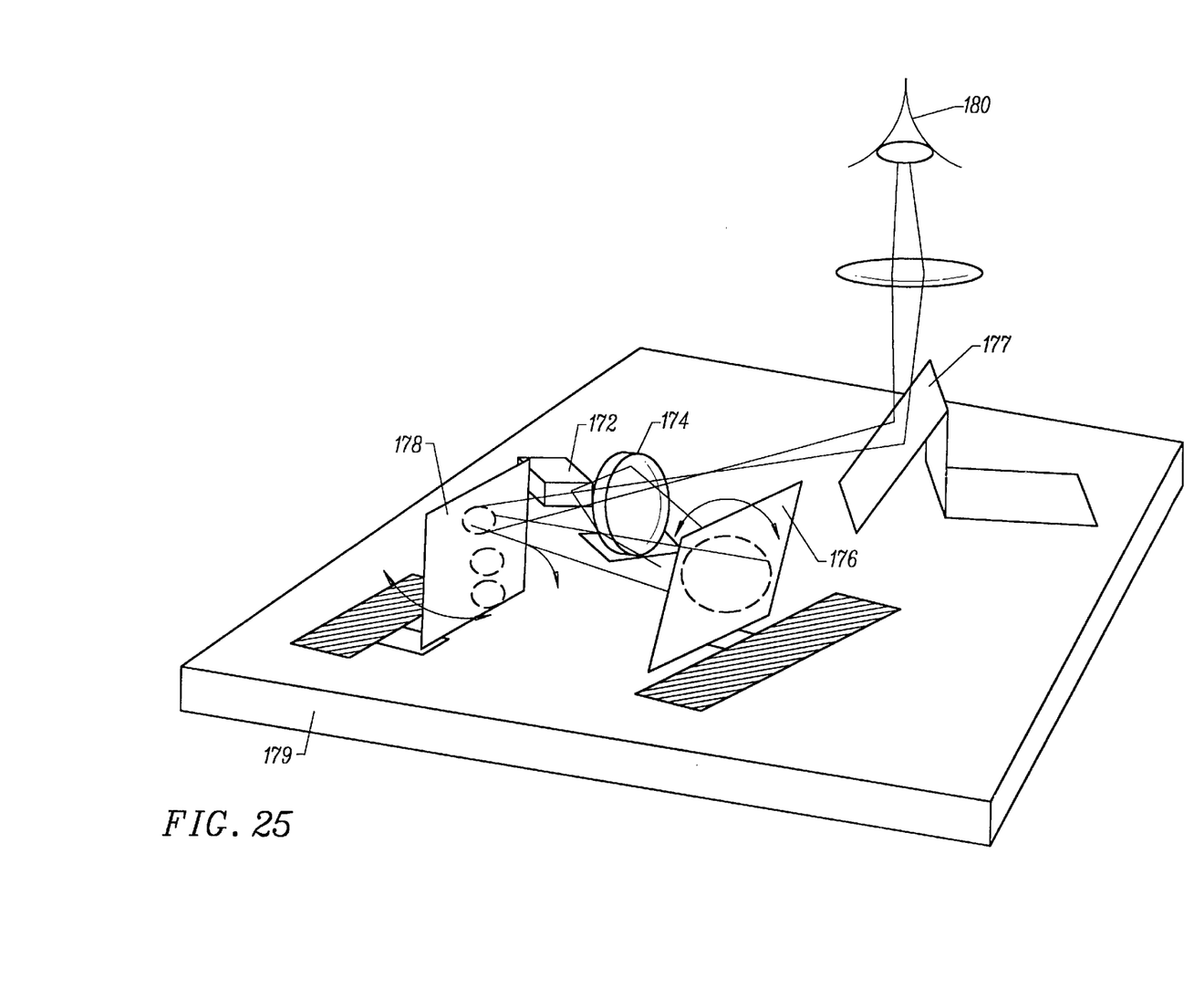
FIG. 25 illustrates multiple optical scanning resonant MEMS used in a multi-axis optical system, such as a raster scanning display.

The single-mirror scanners of FIGS. 4 and 7 can be combined to form a more complicated system as shown in FIG. 25. A first optical scanning oscillatory MEMS 176 is used to scan in-plane (X-axis) while a second optical scanning oscillatory MEMS 178 is used to scan out-of-plane (Y-axis). A light source (a laser diode or a LED) 172 and microlenses 174 are integrated on a silicon substrate 179. The reflected light is deflected by a stationary mirror 177 to a projection device 180. The apparatus of FIG. 25 can be used either as a studio projector or for direct viewing such as those used in headsets. The two-mirror, two-axis raster scanner of FIG. 25 finds a wide range of applications also in areas such as communications, medicine, and entertainment, to name a few.

Returning to FIG. 23, shown, in phantom, is a vacuum package 190 for the optical scanning oscillatory MEMS 50. The vacuum package alleviates the adverse effect from the atmospheric air, such as the effect of air turbulence on mirror deformation and damping, the erosion of the mirror surface, and the vibrational and temperature instability of the resonance response. Moreover, lowering air-pressure increases significantly the Q-factor for those systems in which air drag is the main source of damping. This leads to an even higher mechanical performance (e.g., larger scan angle with the same driving voltage) and potentially better reliability for the oscillatory microscanner system. Vacuum packaging is very difficult and costly in macroscopic systems.

The unique silicon microhinge technology allows the creation of high-aspect-ratio optical surfaces with dimensions in the hundreds of micro-meters, essential for higher image/spot resolution, while taking advantage of the planar integrated-circuit processing technology. Note that the optical axes of the optical devices, e.g., the micromirrors and the microlenses, are fabricated perpendicular to the silicon substrate (after assembly, the optical axes of the system are parallel to the silicon substrate). The advantages of this are legion. For example, it enables the full integration of the laser diode and the other micromechanical devices on the same silicon chip, such that packaging is much easier. Thus, no investments in expensive equipment and no special processes are required. Instead, standard silicon integrated-circuit processing facilities may be exploited.

The invention has been described in reference to specific examples. Obvious improvements upon the examples may be made. For example, by simply moving the rotational axis of the micromirror closer to its bottom, a larger scan-angle can be obtained while the rest of the scanner structure remains unchanged. The scan-angle can also be improved by lengthening the comb fingers, which increases the range of the rotor excursion.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. An optical scanning system, comprising:

a light source to generate a light beam; and an oscillatory microelectromechanical system including a mirror to deflect said light beam in a predetermined manner, said oscillatory microelectromechanical system including an oscillatory drive mechanism formed in a central plane of said oscillatory microelectromechanical system to produce a motive force, a mirror slider attached to said oscillatory drive mechanism in said central plane, said mirror slider responding to said motive force to produce an oscillatory physical motion in said central plane, a mirror frame support to hold said mirror outside of said central plane of said oscillatory microelectromechanical system, and rotational shafts positioned between said mirror frame support and said mirror, said oscillatory physical motion of said mirror slider forcing said mirror to pivot with respect to said rotational shafts in an oscillatory manner.

2. The apparatus of claim 1 wherein said light source and said oscillatory microelectromechanical system are formed on a silicon substrate.

3. The apparatus of claim 1 wherein said light source is a laser.

4. The apparatus of claim 1 wherein said light source is a light emitting diode.

5. The apparatus of claim 1 wherein said oscillatory drive system is a comb drive.

6. The apparatus of claim 5 wherein said comb drive includes an input node to receive a voltage signal.

7. The apparatus of claim 1 further comprising a second oscillatory microelectromechanical system including a second mirror to deflect said light beam in a predetermined manner.

8. The apparatus of claim 7 further comprising a projection device.

9. An optical scanning system, comprising;

a light source to generate a light beam;

an oscillatory microelectromechanical system including a mirror to deflect said light beam in a predetermined manner;

a collecting lens; and a signal processing device, said collecting lens receiving a reflected barcode signal and said signal processing device converting said reflected barcode signal from a time signal into an equivalent spacial signal.

10. An optical scanning system, comprising:

a light source to generate a light beam;

an oscillatory microelectromechanical system including a mirror to deflect said light beam in a predetermined manner;

a collecting lens; and a signal processing device, said collecting lens receiving a reflected barcode signal and said signal processing device converting said reflected barcode signal from a scanner angular velocity signal to a light beam linear scan rate signal.

11. An optical scanning system, comprising:

a light source to generate a light beam;

an oscillatory microelectromechanical system including a mirror to deflect said light beam in a predetermined manner; and a vacuum package surrounding said oscillatory microelectromechanical system.

12. A method of optical scanning, said method comprising the steps of:

generating a light beam;

operating a mirror of a microelectromechanical system in an oscillatory mode, said operating step including the step of producing an oscillatory physical motion in a first plane of said microelectromechanical system which is converted to an oscillatory physical motion in a second plane of said microelectromechanical system; and deflecting said light beam in a first direction with said microelectromechanical system.

13. The method of claim 12 further comprising the step of deflecting said light beam in a second direction with a second microelectromechanical system.

14. The method of claim 13 further comprising the step of processing said light beam at a projection device.

15. The method of claim 12 wherein said operating step includes the step of applying a voltage to said microelectromechanical system.

16. A method of optical scanning, said method comprising the steps of:

generating a light beam;

operating a mirror of a microelectromechanical system in an oscillatory mode;

deflecting said light beam in a first direction with said microelectromechanical system; and converting a reflected barcode signal from a time signal into an equivalent spacial signal.

17. A method of optical scanning, said method comprising the steps of:

generating a light beam;

operating a mirror of a microelectromechanical system in an oscillatory mode; and deflecting said light beam in a first direction with said microelectromechanical system converting a reflected barcode signal from a scanner angular velocity signal to a light beam linear scan rate signal.

* * * * *